June 20, 1972  YOSHIO MURAKAMI ETAL  3,671,312
METHOD FOR MANUFACTURING MAGNETIC THIN FILM ELEMENT
Filed July 29, 1970  2 Sheets-Sheet 1

3,671,312
METHOD FOR MANUFACTURING MAGNETIC THIN FILM ELEMENT
Yoshio Murakami, Yokohama, Iwao Higashinakagawa, Kawasaki, Nobuaki Yasuda, Zushi, and Syozo Takeno, Yokohama, Japan, assignors to Tokyo-Shibaura Electric Co., Ltd., Kawasaki-shi, Japan
Filed July 29, 1970, Ser. No. 59,291
Int. Cl. H01f 10/06
U.S. Cl. 117—212
4 Claims

ABSTRACT OF THE DISCLOSURE

A method for vapor depositing a magnetic thin film element mainly comprising nickel Ni and iron Fe on the surface of a substrate within a magnetic field in an atmosphere of inert gas at a pressure of $1 \times 10^{-3}$ to $5 \times 10^{-2}$ mm. Hg, to form a uniform magnetic thin film with reduced variations in the direction of the easy axis.

BACKGROUND OF THE INVENTION

The present invention relates to improvements in a method for manufacturing by vapor deposition a magnetic thin film element.

Generally, the magnetic thin film element is prepared by vacuum deposition. For instance, where there is produced by vacuum deposition a flat magnetic film element, there is thermally evaporated a Ni-Fe alloy (Permalloy) in a crucible within a vacuum chamber maintained at a pressure of $1 \times 10^{-4}$ mm. Hg max., or preferably $1 \times 10^{-5}$ to $1 \times 10^{-7}$ mm. Hg, and the vapor of said Ni-Fe alloy is condensed on the surface of a substrate, for example, a glass plate for vapor deposition which is set at that part of the vacuum chamber disposed opposite to said evaporation source.

If, in this case, there is attained a high vacuum as $1 \times 10^{-4}$ mm. Hg, the average distance of a free travel made by atoms of nickel or iron through the space will be longer than the substance between the evaporation source and substrate, the flow of vapor following the law of molecule streams. Accordingly, atoms of nickel or iron released from the evaporation source are supposed to proceed straight through the space in the same manner as if light was projected from the evaporation source to the substrate. Therefore, where vapor deposition is applied to a broad substrate using a spot evaporation source like a crucible, it is difficult to make flying atoms reach all over the broad surface of the substrate at a uniform angle of incidence. Even where there is used instead a linear or annular evaporation source prepared, for example, by winding a Ni-Fe alloy wire about a tungsten wire, it is next to impossible to permit flying atoms to be brought to every point on the substrate surface at a uniform angle of incidence. On the other hand, when a magnetic thin film consisting of, for example, Ni-Fe alloy is vapor deposited parallel to the substrate surface by applying a D.C. or A.C. magnetic field having an intensity of about 10 to 200 oersteds, then the film presents a uniaxial anisotropy having "easy" magnetization direction in the direction of the magnetic field. Generally, therefore, this effect of magnetic field vapor deposition is utilized in manufacturing a magnetic thin film element. However, there is another significant factor causing the magnetic thin film to present such an anisotropy characteristic, that is, the angle of incidence of flying atoms to the normal of the substrate surface when they are brought thereto for vapor deposition. Where the substrate temperature is lower than 300° C. during vapor deposition, the effect of this angle of incidence becomes pronounced. Accordingly, it is very difficult to limit the angular displacement of the direction of the "easy" axis to within 1 to 2° over the entire surface of a broad substrate, and to reduce variations in the intensity of an anisotropy field H$k$ or a coercive force H$c$. This obstructs the manufacture of a large number of magnetic thin film elements by a single operation of vapor deposition. Since the anisotropy field and coercive force have a great bearing on the preservability of information stored in a magnetic thin film, it is desired that the aforesaid variations be as much minimized as possible.

SUMMARY OF THE INVENTION

The present invention has been accomplished in view of the above-mentioned situation, and provides a method for manufacturing a magnetic thin film element, which enables different angles of incidence defined by flying atoms at various points over the broad surface of the substrate to be as much eliminated as possible, thereby reducing the angular displacement of the direction of the "easy" axis and variations of the anisotropy field and coercive force.

DETAILED DESCRIPTION OF THE INVENTION

Figure 1:
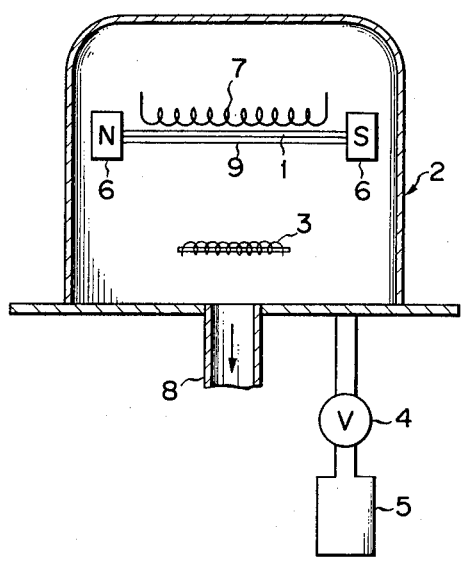
FIG. 1 is a schematic diagram of a vapor deposition device used in the method according to the present invention of manufacturing a magnetic thin film element.

There will now be described by reference to FIG. 1 an embodiment of the method of the present invention. First, a substrate 1, for example, a glass plate 40 mm. x 300 mm. is fully masked and placed in a vapor deposition device 2. The evaporation source 3 used is prepared by winding a wire of 80% Ni-20% Fe Permalloy 0.2 mm. in diameter about a straight tungsten wire 2 mm. in diameter and more than 300 mm. long. In this case, the Permalloy wire is so wound as to extend all along the tungsten wire more than 300 mm. long. The evaporation source 3 thus assembled is placed in the vapor deposition device 2 parallel to the glass substrate 1 in its lengthwise direction at a prescribed space, followed by evacuation of the vapor deposition device 2. Said evacuation is conducted through an exhaust tube 8 using a vacuum pump (not shown) as in the prior art so as to degas the vacuum chamber 2 and evaporation source 3, obtaining a high vacuum of $1 \times 10^{-5}$ mm. Hg max. Generally, oxygen and carbon dioxide contained in the residual gas in the vacuum chamber 2 have a harmful effect on the magnetic properties of a magnetic thin film element. Accordingly, the lower the residual gas pressure, the greater advantage will result. Into the vacuum chamber 2 is introduced argon from a cylinder 5 by opening a valve 4 until the partial pressure of argon within the vacuum chamber 2 remains stable at $1 \times 10^{-3}$ to $5 \times 10^{-2}$ mm. Hg. In the meantime there is applied parallel to the surface of the substrate 1 a D.C. magnetic field of about 100 oersteds by a magnetizing means 6 such as a Helmholtz coil or electromagnet. The temperature of the substrate 1 is maintained within the range of from room temperature to 300° C. using a molybdenum heater 7 previously disposed in the vacuum chamber 2. Vapor deposition is finished about 10 seconds after current is introduced through the evaporation source for heating.

Figure 2:
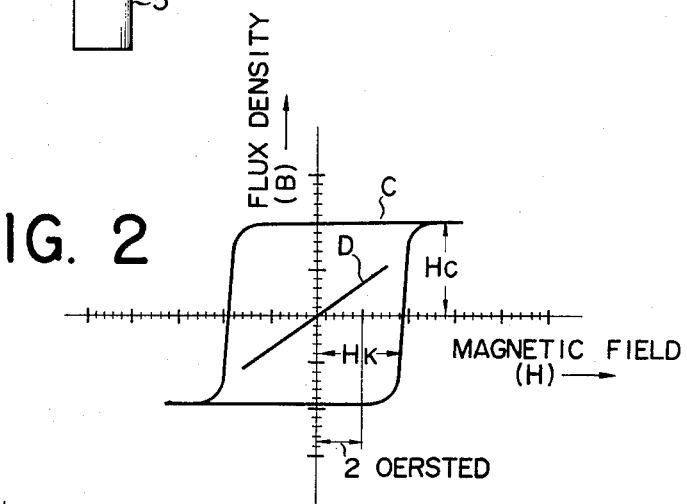
FIG. 2 is a B-H curve illustrating the properties of a magnetic thin film element manufactured by the method of the present invention.
Figure 3:
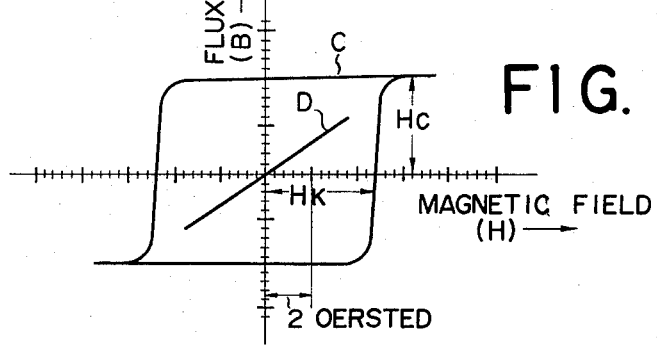
FIG. 3 is a reference B-H curve showing the properties of a magnetic thin film element manufactured under the condition where pressure is reduced to below $1 \times 10^{-4}$ mm. Hg in vapor deposition.

The magnetic thin film 9 thus prepared has a full uniaxial anisotropy property as indicated by a straight line D in the B-H curve of FIG. 2 (substrate temperature 30° C. in vapor deposition). This magnetic film 9 indeed displays a slightly smaller anisotropy field H$k$ and coercive force H$c$ than a magnetic film shown for comparison in FIG. 3 which was prepared under the same conditions excepting that pressure was reduced to below $1\times10^{-4}$ mm. Hg in vapor deposition and there was not contained any inert gas in the vacuum chamber. But the magnetic properties of the former magnetic film 9 are not affected at all. Namely, the method of the present invention, even when applied to a large glass plate as used in the foregoing embodiment, can limit the angular displacement of the direction of the "easy" axis to 1 to 2° where the substrate temperature is relatively high. Even when the substrate temperature is relatively low, the angular displacement of the direction of the "easy" axis can be maintained below several degrees. Furthermore, it is possible to minimize differences in the intensity of the anisotropy field H$k$ and coercive force H$c$ between the substrate center and its vicinity. Such advantage was extremely difficult to obtain with high vacuum vapor deposition as heretofore practised.

As mentioned above, vapor deposition in an atmosphere of inert gases including argon at a pressure of $1\times10^{-3}$ mm. Hg to $5\times10^{-2}$ mm. Hg enables a magnetic thin film to be prepared with superb properties. Following is the reason. Where an inert gas, for example, argon has a pressure of $2\times10^{-3}$ mm. Hg, atoms of nickel or iron freely travel about 2 to 3 cm. on average, far smaller than a distance of 20 to 30 cm. between the evaporation source and substrate of an ordinary vapor evaporation device. Accordingly, the aforesaid metal atoms repeatedly collide with the molecules of the remaining argon gas while they travel from the evaporation source to the substrate, so that they proceed in scattered directions and in the vicinity of the substrate take such a course as is little related to the position of the evaporation source and assume a substantially equal angle of incidence.

Namely, the method of the present invention is based on the fact that atoms to be vapor deposited proceed straight through vacuum, whereas when vapor is deposited in inert gas, the atoms travel in scattered form due to the presence of the inert gas and are brought to the substrate at random angles. Let it be assumed that metal atoms $\sigma_m$ in diameter advance through inert gas whose atoms have a diameter of $\sigma_g$. Then the mean free path $\lambda_m$ of the free travel of the metal atoms may be expressed as $$\lambda_m = \frac{4}{\sqrt{1+\frac{m_m}{m_g}}\,\pi n_g(\sigma_m+\sigma_g)^2}$$

Where:

$m_m$ and $m_g$ = the mass of metal atoms and that of inert gas molecule respectively
$n_g$ = density of inert gas
$\pi$ = ratio of circumference.

Where the inert gas used consists of argon at a temperature of 20° C., and the metal consists of nickel, $\lambda_m$ = about 5 cm. at $1\times10^{-3}$ torr Ar
about 0.1 cm. at $5\times10^{-2}$ torr Ar $\lambda_m$ at $1\times10^{-3}$ torr with respect to other inert gases runs as follows:

$\lambda_m$ = about 3.4 cm. for krypton
about 2.8 cm. for xenon
about 10.1 cm. for neon.

Assuming that the evaporation source is spaced 20 cm. from the vapor deposition plane, then the nickel atoms will be scattered 10 times in the course of their travel to said plane under Ar pressure of $5\times10^{-3}$ torr, namely arrive there in random directions. Accordingly, the nickel atoms will be deposited at an equal angle of incidence not only at that point of the vapor deposition plane exactly opposite to the evaporation source but also at other points. For example, where evaporation is conducted on wire-like material in an atmosphere of inert gas under a suitable pressure with an evaporation source placed above and below the wire-like material, then there can be deposited a magnetic thin film under the condition where there is formed a fully closed magnetic path.

The method of the present invention may be applicable not only to glass but also to metals, and the metals whose surface consists of insulating material.

The foregoing embodiment involved a magnetic thin film of binary alloy consisting of nickel and iron. However, it will be apparent that the method of the present invention may be used in the same manner as in said embodiment with a magnetic thin film containing nickel and iron as the main components and minor amounts of other elements such as cobalt and molybdenum.

As mentioned above, the aforesaid embodiment of the invention can minimize the angular displacement of the direction of the "easy" axis in a broad flat magnetic thin film and consequently variations in the antisotropy field H$k$ and coercive force H$c$, thereby producing said thin film in better yield and with uniform reliable quality.

The above-mentioned embodiment relates to the case where there was performed evaporation on a flat substrate having a broad surface area compared with the size of an evaporation source. There will now be further described by reference to FIGS. 4, 5 and 6 the method of preparing a magnetic thin film possessing a uniform quality utilizing the same scattering phenomenon as referred to above.

Figure 4:
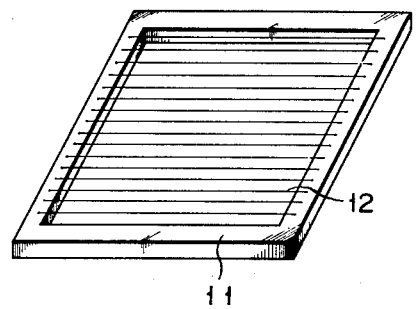
FIG. 4 shows the process of depositing a magnetic thin film element by the method of the present invention on a block of digit lines.

FIG. 4 illustrates the case where there is deposited a magnetic thin film on a block of digit lines. On a frame 11 made of heat resistant insulating material, for example Teflon, are fixed Phosphor bronze wires 12 coated with heat resistant insulating material at a spacing of 100 microns. While current is introduced through these wires, there is deposited thereon Permalloy in an atmosphere of argon at a pressure of $5\times10^{-3}$ torr with the temperature of the base material of Phosphor bronze wire kept at 250° C. There are placed evaopration sources above and below the block of wires in a plane perpendicular to that of said wires. This process permits the deposition of a uniform magnetic thin film whose direction of the "easy" axis is oriented in the peripheral direction of the wire, with the resultant formation of a closed magnetic path. There is prepared a thin film memory element by closely attaching a block of word lines to a block of digit lines.

Figure 5:
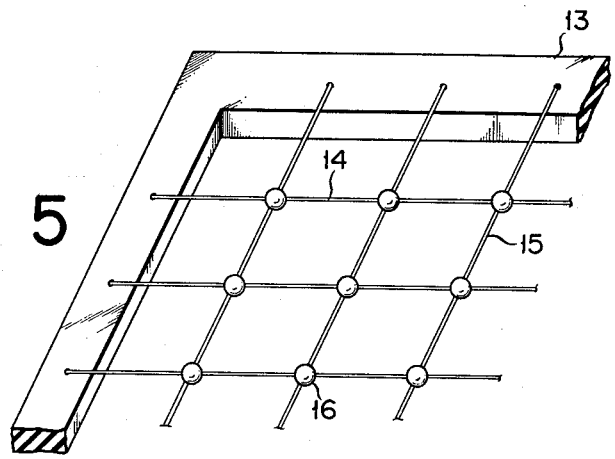
FIG. 5 shows the process of forming an operating section on an assembled memory element.

FIG. 5 illustrates the process of forming a memory cell performing the same memory action as a ferrite core memory at the joints of blocked lines intersecting each other at right angles. On a frame 13 made of Teflon are fitted Phosphor bronze wires 14 and 15 coated with heat resistant insulating material in a manner to intersect each other at right angles at a 100 micron pitch. The wire assembly is dipped in a solution of polyamide resin prepolymer to be coated therewith, followed by thermal curing. Then around each juncture of the intersecting lines is formed a small spherical body 16 of polyamide resin. At this point, vapor deposition is carried out in the same manner as in the preceding embodiment of FIG. 1, causing Permalloy of uniform quality to be coated on the wire assembly in such a manner as to wrap each spherical body 16 formed at said junctures. Thus is prepared a memory plane performing a memory action on the same principle as the ferrite core memory.

Figure 6:
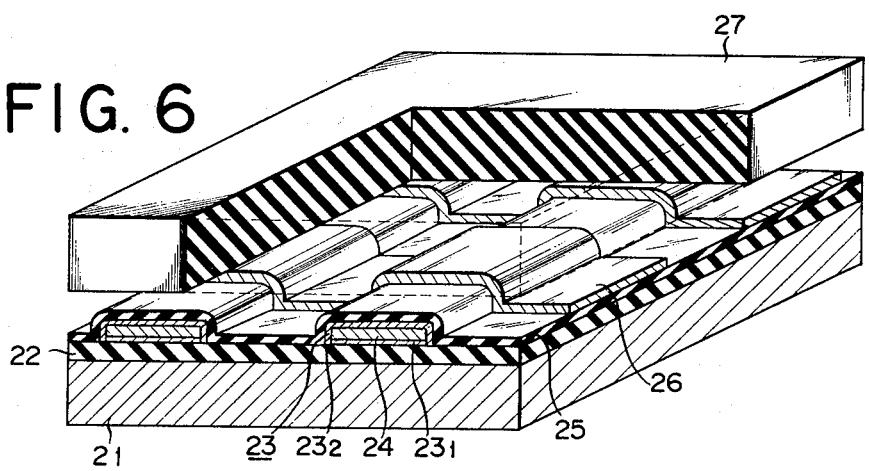
FIG. 6 is a pictorial view, partly broken away, of the typical arrangement of a memory element involving densely arranged magnetic thin film elements prepared by the method of the present invention.
Figure 7:
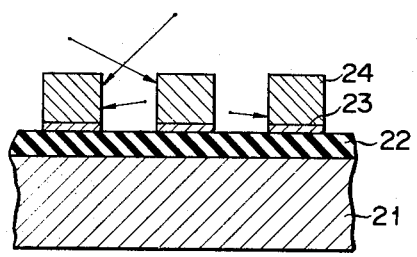
FIG. 7 illustrates part of the process of manufacturing the memory element of FIG. 6.

FIGS. 6 and 7 jointly illustrate the case where the present invention is applied in manufacturing magnetic thin film memory elements in a dense arrangement. The thin film memory element is prepared in the following manner. There is provided a member 21 consisting of a copper plate 2 mm. thick whose surface was ground in advance. The ground surface is coated with a heat resistant insulating resin 22, for example polyamide resin, to a thickness of 10 microns, followed by baking at 200° C. Over the entire substrate surface is vapor deposited a first Permalloy layer $23_1$ to a thickness of 1000 A. within a magnetic field with the substrate temperature of 300° C. Then there is vapor deposited a copper layer 24 to a thickness of 5 microns similarly over the entire substrate surface. The Permalloy and copper layers are photoetched into strips 100 microns wide and spaced 100 microns from each other. Thereafter there is vapor deposited a second Permalloy layer $23_2$ to a thickness of 1000 A. in an atmosphere of argon at a pressure of $5 \times 10^{-3}$ torr. Those parts of the Permalloy layer coated between the wires are photoetched to obtain a magnetic thin film 23 surrounding the digit lines 24. After the entire mass is covered with an insulating layer 25, there are formed on said layer 25 by an ordinary photoetching technique a large number of word lines consisting of conductors arranged parallel with each other and intersecting the digit lines 24 at right angles. Further on the word lines is placed a magnetic keeper 27.

As mentioned aove, the manufacturing method of the present invention causes magnetic thin films disposed on the underside of the digit lines as well as those positioned on the upper surface and both sides of said digit lines to be prepared alike by vapor deposition and consequently with fully equal quality, thus preventing a magnetic pole from appearing on the boundary defined by the adjacent magnetic thin films as is generally the case with the prior art, and realizing the fully closed magnetic path of a magnetic thin film.

What we claim is:

1. A method for manufacturing a uniaxially anisotropic magnetic thin film memory element by vacuum deposition comprising the steps of:

placing a substrate in a vacuum chamber, said substrate having laminated thereon first spaced parallel magnetic metal alloy thin film strips and second conductive film strips, said magnetic thin film strips being directly deposited on said substrate and said conductive film strips being deposited on respective magnetic thin film strips;

maintaining the pressure of an inert gas atmosphere in said vacuum chamber at $1 \times 10^{-3}$ to $5 \times 10^{-2}$ mm. Hg;

creating a magnetic field over the surface of said substrate; and depositing a second magnetic metal alloy thin film from an evaporation source positioned adjacent said substrate, said second magnetic thin film covering said conductive film strips and contacting said first magnetic metal alloy thin film strips to form a closed flux path with said first magnetic thin film strips completely encircling said conductive film strips.

2. A method according to claim 1 wherein said second magnetic thin film contacts the side walls of said first magnetic thin film strips.

3. A method according to claim 1 wherein said inert gas is argon.

4. A method according to claim 2 wherein said evaporation source is formed of at least Ni-Fe alloy.

References Cited

UNITED STATES PATENTS

| | | | |
|---|---|---|---|
| 3,436,813 | 4/1969 | Wells et al. | 117—239 UX |
| 3,065,105 | 11/1962 | Pohm | 117—238 |
| 3,525,638 | 8/1970 | Archey | 117—240 |
| 3,100,295 | 8/1963 | Schweizerhof | 117—238 X |
| 3,327,297 | 6/1967 | Croll | 117—238 X |
| 3,350,222 | 10/1967 | Ames et al. | 117—217 X |
| 3,567,508 | 3/1971 | Cox et al. | 117—212 |

OTHER REFERENCES

Smith, pp. 44 and 45, Thin Magnetic Films for Electronics June 26, 1959.

Takahashi, pp. 1101 to 1106, Journal of Applied Physics, vol. 33, No. 3, March 1962.

WILLIAM D. MARTIN, Primary Examiner

B. D. PIANALTO, Assistant Examiner

U.S. Cl. X.R.

117—5.5, 8, 107, 217, 237, 238, 239, 240; 156—2, 3

PO-1050
(5/69)

UNITED STATES PATENT OFFICE
CERTIFICATE OF CORRECTION

Patent No. 3,671,312           Dated June 20, 1972

Inventor(s) Yoshio MURAKAMI

It is certified that error appears in the above-identified patent and that said Letters Patent are hereby corrected as shown below:

Column 1, in the heading, after line 8 insert the following priority data:

--Claims partial priority, application Japan, July 30, 1969, 59782/69; July 30, 1969, 59788/69--.

Signed and sealed this 24th day of October 1972.

(SEAL)
Attest:

EDWARD M. FLETCHER, JR.          ROBERT GOTTSCHALK
Attesting Officer                 Commissioner of Patents